(12) United States Patent
Otake et al.

(10) Patent No.: US 7,146,805 B2
(45) Date of Patent: Dec. 12, 2006

(54) REGENERATION CONTROL OF DIESEL PARTICULATE FILTER

(75) Inventors: Makoto Otake, Yokohama (JP);
Junichi Kawashima, Yokosuka (JP);
Naoya Tsutsumoto, Yokohama (JP);
Terunori Kondou, Yokohama (JP);
Takao Inoue, Yokohama (JP);
Shouichirou Ueno, Yokohama (JP);
Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/942,010

(22) Filed: Sep. 16, 2004

(65) Prior Publication Data

US 2005/0056009 A1  Mar. 17, 2005

(30) Foreign Application Priority Data

Sep. 17, 2003  (JP) .............................. 2003-325040

(51) Int. Cl.
*F01N 3/00* (2006.01)
*F01N 3/02* (2006.01)

(52) U.S. Cl. .............................. 60/297; 60/311; 60/277

(58) Field of Classification Search .................. 60/284, 60/285, 286, 295, 303, 297, 311
See application file for complete search history.

(56) References Cited

U.S. PATENT DOCUMENTS 5,711,149 A * 1/1998 Araki ........................ 60/278
6,438,948 B1 * 8/2002 Ono et al. ................... 60/311
6,622,480 B1 * 9/2003 Tashiro et al. ............... 60/295
6,698,192 B1 * 3/2004 Ootake ....................... 60/297
2002/0078681 A1 * 6/2002 Carberry et al. ............. 60/280

FOREIGN PATENT DOCUMENTS

JP  5-106427 A   4/1993
JP  2003-314250  11/2003

OTHER PUBLICATIONS

U.S. Appl. No. 10/937,271, filed Sep. 10, 2004, Ueno et al.
U.S. Appl. No. 10/937,272, filed Sep. 10, 2004, Tsutsumoto et al.
U.S. Appl. No. 10/942,009, filed Sep. 16, 2004, Kondou et al.

* cited by examiner

*Primary Examiner*—Thomas Denion
*Assistant Examiner*—Loren Edwards
(74) *Attorney, Agent, or Firm*—Foley & Lardner LLP

(57) ABSTRACT

To regenerate a diesel particulate filter (10) which traps particulate matter contained in the exhaust gas of a diesel engine (20), a controller (16) raises the temperature of the exhaust gas through fuel injection control of a fuel injector (23), and thus burns the particulate matter trapped in the filter (10). The controller (16) cumulatively calculates the time during which the temperature of the filter (10) exceeds a target temperature as an effective regeneration time. By estimating the amount of particulate matter remaining in the filter (10) on the basis of the effective regeneration time, the controller (16) estimates the amount of remaining particulate matter with a high degree of precision and without consuming energy, whereupon regeneration of the filter (10) through fuel injection control ends.

7 Claims, 4 Drawing Sheets

REGENERATION CONTROL OF DIESEL PARTICULATE FILTER

FIELD OF THE INVENTION

This invention relates to regeneration control of a filter which traps particulate matter contained in the exhaust gas of a diesel engine.

BACKGROUND OF THE INVENTION

A diesel particulate filter (hereinafter referred to as DPF) which traps particulate matter contained in the exhaust gas of a diesel engine for a vehicle performs regeneration by burning the trapped particulate matter when the amount of trapped particulate matter reaches a certain level, and thus becomes able to trap particulate matter again.

Known methods for burning the particulate matter include a method of raising the temperature of the exhaust gas by fuel injection control, and a method of raising the temperature of the DPF using a heater.

SUMMARY OF THE INVENTION

However, the operating condition of a diesel engine for a vehicle varies constantly, and hence it is not always possible to remove all of the particulate matter trapped in the DPF in one regeneration operation. As a result, regeneration ends with a part of the particulate matter remaining in the DPF. Such a state will be referred to as partial regeneration in the following description.

If particulate matter trapping is resumed in a partially regenerated state, errors are likely to occur when estimating the amount of particulate matter trapped in the DPF in order to determine the next regeneration timing.

Tokkai Hei 5-106427, published by the Japan Patent Office in 1993, proposes a method in which, following partial DPF regeneration, the DPF is heated by a heater until an end face of the DPF reaches a set temperature, and the required heating time is measured. Meanwhile, a fixed amount of regeneration gas is supplied to the DPF before and after partial regeneration, and a difference in the flow speed thereof is measured. Thus the amount of particulate matter remaining in the DPF is precisely estimated on the basis of the required heating time and the difference in the regeneration gas flow speed.

In this prior art, however, a heater and a pump for supplying the regeneration gas must be used every time the amount of remaining particulate matter is estimated, and hence a large amount of electrical energy is consumed during regeneration of the DPF.

It is therefore an object of this invention to estimate an amount of remaining particulate matter with a high degree of precision and without consuming energy.

In order to achieve the above object, this invention provides a regeneration device for a diesel particulate filter which traps particulate matter contained in an exhaust gas of a diesel engine. The device comprises a sensor which detects a temperature of the filter, a mechanism which raises the temperature of the exhaust gas in order to burn the particulate matter trapped in the filter and a programmable controller programmed to cumulatively calculate a time during which the temperature of the filter exceeds a target temperature as an effective regeneration time, and control the mechanism to stop raising the exhaust gas temperature, on the basis of the effective regeneration time.

This invention also provides a regeneration method for the above diesel particulate filter that is associated with the above exhaust gas temperature raising mechanism. The method comprises determining a temperature of the filter, cumulatively calculating a time during which the temperature of the filter exceeds a target temperature as an effective regeneration time, and controlling the mechanism to stop rasing the exhaust gas temperature, on the basis of the effective regeneration time.

The details as well as other features and advantages of this invention are set forth in the remainder of the specification and are shown in the accompanying drawings.

DESCRIPTION OF THE PREFERRED EMBODIMENTS

Figure 1:
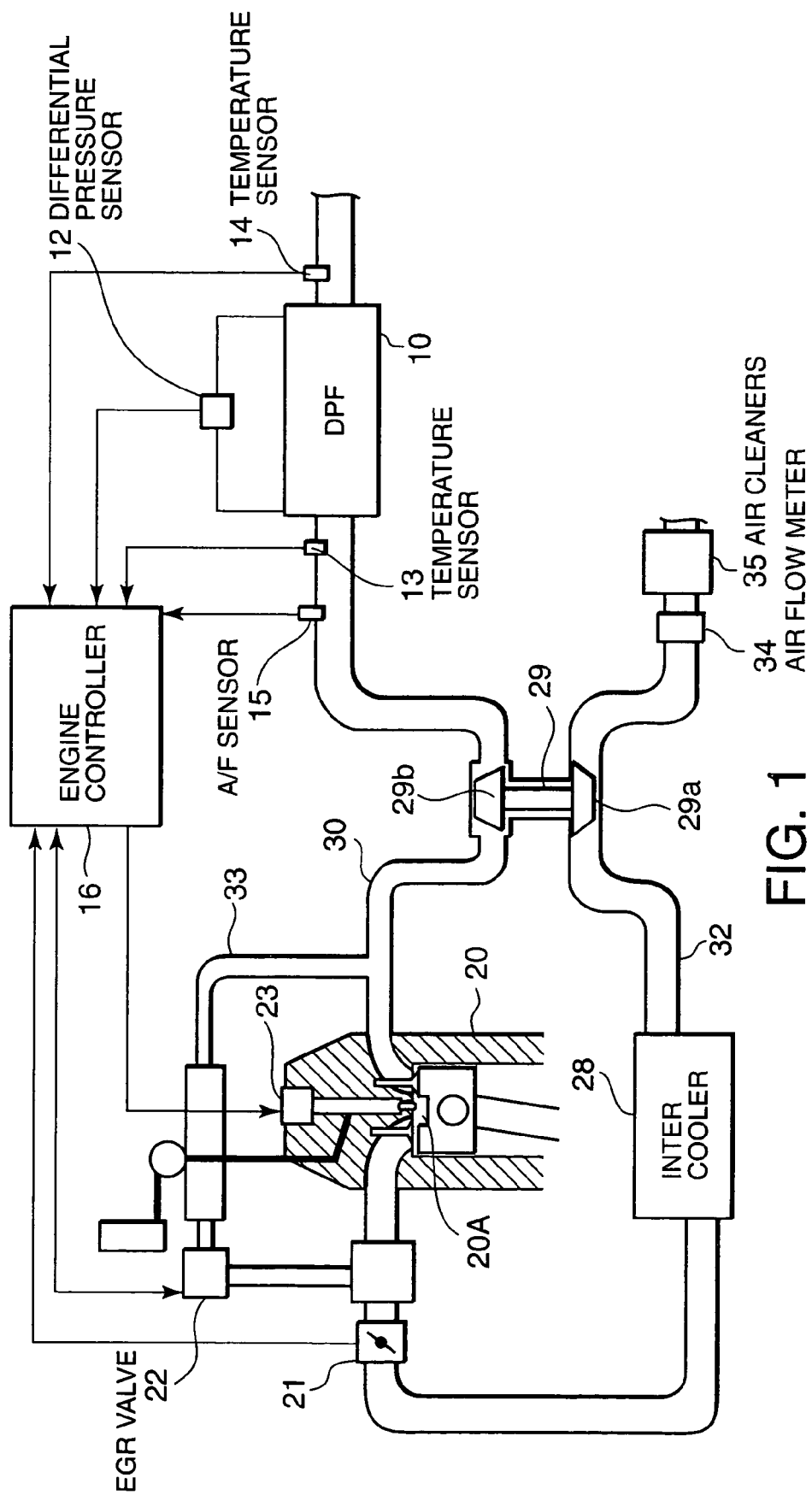
FIG. 1 is a schematic diagram of an engine for use in a vehicle, comprising a DPF regeneration device according to this invention.

Referring to FIG. 1 of the drawings, a diesel engine 20 for a vehicle comprises an intake passage 32 and an exhaust passage 30 connected to a combustion chamber 20A.

The diesel engine 20 burns a mixture of air that is aspirated into the combustion chamber 20A from the intake passage 32 and fuel that is injected into the combustion chamber 20A by a fuel injector 23 by means of compression ignition. The combustion gas is discharged from the exhaust passage 30 as exhaust gas.

An air cleaner 35, a compressor 29A of a turbocharger 29, an inter cooler 28, and an intake throttle 21 are provided on the intake passage 32. The intake air in the intake passage 32 is purified by the air cleaner 35, compressed by the compressor 29A, cooled by the inter cooler 28, and then aspirated into the combustion chamber 20A via the intake throttle 21.

A turbine 29B of the turbocharger 29 and a DPF 10 are provided on the exhaust passage 30. The exhaust gas that is discharged from the combustion chamber 20A into the exhaust passage 30 drives the turbine 29B to rotate. The exhaust gas is then discharged into the atmosphere after trapping particulate matter in the DPF 10.

A part of the exhaust gas in the exhaust passage 30 is recirculated into the intake air via an exhaust gas recirculation passage (EGR passage) 33. The EGR passage 33 connects the exhaust passage 30 upstream of the turbine 29B to the intake passage 32 downstream of the intake throttle 21. An exhaust gas recirculation valve (EGR valve) 22 for regulating the exhaust gas recirculation flow (EGR flow) is provided on the EGR passage 33.

The DPF 10 traps particulate matter contained in the exhaust gas in the exhaust passage 30, and regenerates by burning the trapped particulate matter at a predetermined regeneration temperature. A known ceramic porous filter may be used as the DPF 10.

Regeneration of the DPF 10 is performed by raising the exhaust gas temperature through control of the fuel injection amount and injection timing of the fuel injector 23 using an engine controller 16. Control of the injection timing to raise the exhaust gas temperature includes post-injection and injection timing retardation. Such fuel injection control for raising the exhaust gas temperature is well-known.

The engine controller 16 is constituted by a microcomputer comprising a central processing unit (CPU), read-only memory (ROM), random access memory (RAM), a clock, and an input/output interface (I/O interface). The controller may be constituted by a plurality of microcomputers.

To control regeneration of the DPF 10, detection data from an air flow meter 34 which detects the intake air amount, a differential pressure sensor 12 which detects the differential pressure between the inlet and outlet of the DPF 10, a temperature sensor 13 which detects the exhaust gas temperature upstream of the DPF 10, a temperature sensor 14 which detects the exhaust gas temperature downstream of the DPF 10, and an air/fuel ratio sensor (A/F sensor) 15 which detects from the oxygen concentration in the exhaust gas the air/fuel ratio of the air/fuel mixture supplied to the combustion chamber 20A are input respectively into the controller 16 as signals. A universal exhaust gas oxygen sensor or a less expensive oxygen sensor may be used as the A/F sensor 15.

Next, referring to FIG. 2, a control routine for regenerating the DPF 10, which is executed by the engine controller 16, will be described. The engine controller 16 starts the routine together with the beginning of an operation of the diesel engine 20. As soon as the routine ends, the next execution of the routine begins, and hence the routine is executed substantially constantly while the diesel engine 20 is operative.

First, in a step S101, the engine controller 16 estimates an amount of trapped particulate matter PMi in the DPF 10 on the basis of the differential pressure detected by the differential pressure sensor 12.

Next, in a step S102, the engine controller 16 determines whether or not the amount of trapped particulate matter PMi has reached a reference trapped amount PMα for regenerating the DPF 10. The reference trapped amount PMα for regenerating the DPF 10 is determined in advance through experiment.

If the amount of trapped particulate matter PMi has not reached the reference trapped amount PMα for regenerating the DPF 10, the engine controller 16 repeats the process from the step S101.

When the amount of trapped particulate matter PMi reaches the reference trapped amount PMα for regenerating the DPF 10, the engine controller 16 determines in a step S103 a target DPF inlet temperature Td from the amount of trapped particulate matter PMi.

Figure 3:
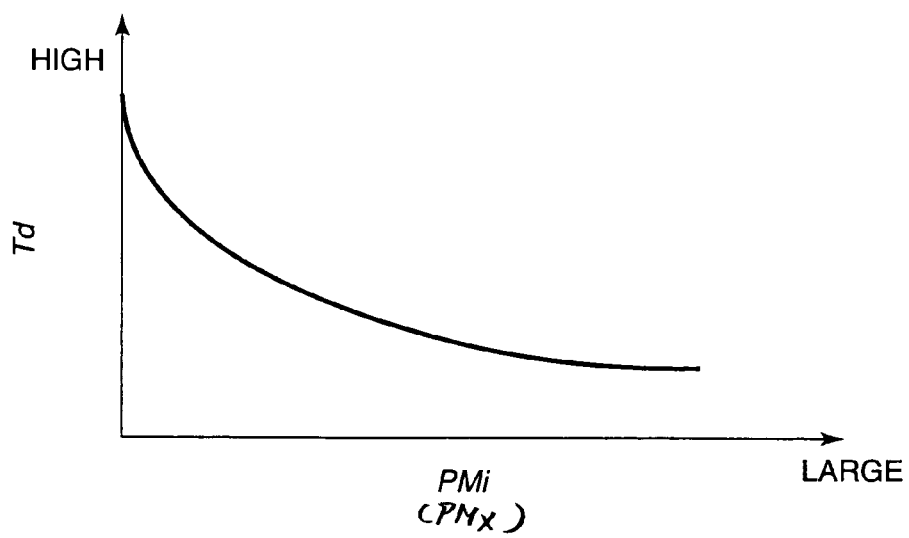
FIG. 3 is a diagram showing the characteristic of a map of an amount of trapped particulate matter PMi, which is stored by the controller.

The determination is performed by looking up a map previously stored in the ROM and having the characteristic shown in FIG. 3. According to this map, the target DPF inlet temperature Td decreases as the amount of trapped particulate matter PMi increases. If the amount of trapped particulate matter PMi is large, then the amount of particulate matter that is burned by a regeneration operation of the DPF 10 increases, and hence the temperature of the DPF 10 becomes likely to rise excessively as a result of the combustion heat.

By setting the target DPF inlet temperature Td to decrease as the amount of trapped particulate matter PMi increases, such excessive rises in temperature can be prevented.

Next, in a step S104, an operation to raise the temperature of the exhaust gas is begun in order to realize the target DPF inlet temperature Td. This operation is performed by means of fuel injection control such as retardation of the fuel injection timing, or post-injection whereby additional fuel is injected following normal fuel injection. In cases where the regeneration device comprises a heater, the exhaust gas temperature may be raised using the heater.

Next, in a step S105, the engine controller 16 estimates a bed temperature Tbed of the DPF 10 from an exhaust gas temperature T1 upstream of the DPF 10, which is detected by the temperature sensor 13, and an exhaust gas temperature T2 downstream of the DPF 10, which is detected by the temperature sensor 14, in accordance with the following equation (1).

$$Tbed = b1 \cdot T1 + b2 \cdot T2 \qquad (1)$$

where, b1, b2=experimentally determined constants.

Next, in a step S106, the engine controller 16 calculates an effective regeneration time Te. The effective regeneration time Te is a cumulative value of the time during which the bed temperature Tbed of the DPF 10 exceeds a target bed temperature Tx. The target bed temperature Tx is set to a temperature at which regeneration of the DPF 10 is performed reliably, or in other words a temperature at which the particulate matter is burned reliably. The target bed temperature Tx varies according to the amount of trapped particulate matter PMi. For example, when the amount of trapped particulate matter PMi is 4.0 gram/litter, the target bed temperature Tx is 580 degrees Centigrade. When the amount of trapped particulate matter PMi is 2.0 gram/litter, the target bed temperature Tx is 600 degrees Centigrade.

Figure 4:
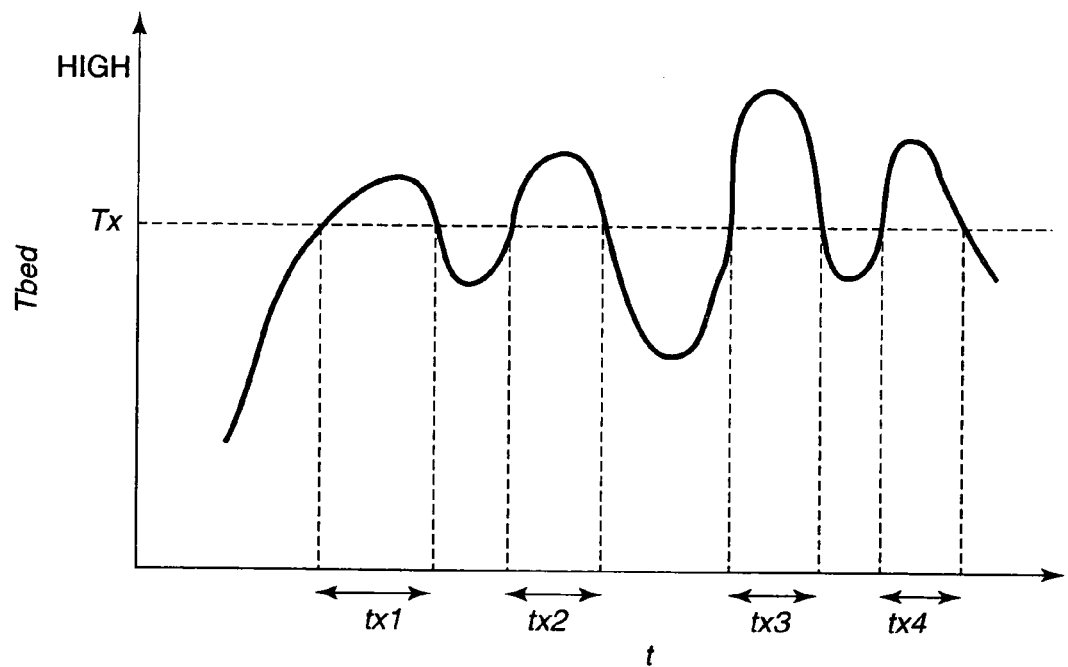
FIG. 4 is a timing chart showing an example of temporal change in a DPF bed temperature Tbed.

Referring to FIG. 4, the bed temperature Tbed of the DPF 10 exceeds the target bed temperature Tx in time slots corresponding to tx1–tx4. The effective regeneration time Te is therefore the cumulative value of these time slots, as shown in the following equation (2).

$$Te = tx1 + tx2 + tx3 + tx4 + \qquad (2)$$

Whenever the bed temperature Tbed of the DPF 10 is updated in the step S105, the engine controller 16 compares the bed temperature Tbed to the target bed temperature Tx in the step S106. The effective regeneration time Te is determined by cumulatively calculating the times during which the bed temperature Tbed exceeds the target bed temperature Tx using the clock function of the microcomputer which constitutes the engine controller 16.

Figure 5:
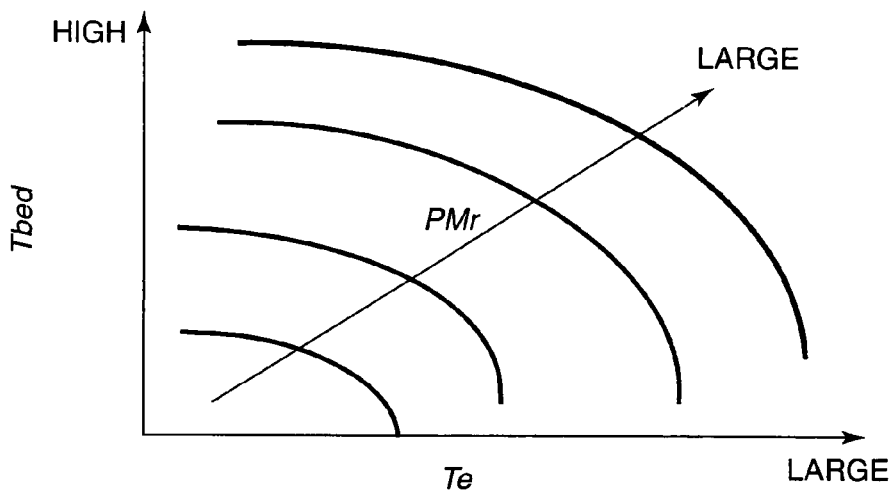
FIG. 5 is a diagram showing the characteristic of a map of an amount of burned particulate matter PMr, which is stored by the controller.

Next, in a step S107, the engine controller 16 refers to a map of the characteristic shown in FIG. 5 and stored in the ROM in advance to determine an amount of burned particulate matter PMr from the bed temperature Tbed of the DPF 10 and the effective regeneration time Te. As shown in the map, the amount of burned particulate matter PMr increases as the bed temperature Tbed of the DPF 10 rises and the effective regeneration time Te lengthens.

Next, in a step S108, the engine controller 16 calculates an amount of remaining particulate matter PMx in the DPF 10 from the amount of burned particulate matter PMr and the amount of trapped particulate matter PMi, which was calculated in the step S101 using the following equation (3).

$$PMx = PMi - PMr \quad (3)$$

Next, in a step S109, the engine controller 16 compares the amount of burned particulate matter PMr to a predetermined target amount of burned particulate matter ΔPM. If the amount of burned particulate matter PMr has not reached the target amount of burned particulate matter ΔPM, the engine controller 16 repeats the process from the step S106 onward. It should be noted that during this repetition period, the particulate matter trapped in the DPF 10 continues to be burned. The predetermined target amount of burned particulate matter ΔPM is preferably one gram for one litter of DPF volume. Since the DPF volume ranges generally from 2 to 4 litters in the case of a passenger vehicle, the predetermined target amount of burned particulate matter ΔPM may be set to 2–4 grams.

When the amount of burned particulate matter PMr reaches the target amount of burned particulate matter ΔPM in the step S109, the engine controller 16 compares the amount of remaining particulate matter PMx in the DPF 10 to a target amount of remaining particulate matter PMd in a step S110. The target amount of remaining particulate matter PMd corresponds to an allowable amount of particulate matter remaining in the DPF 10 at the end of a regeneration operation. This value is set in advance through experiment in accordance with the traveling condition of the vehicle. When the traveling condition is suited for the regeneration of DPF 10, the target amount of remaining particulate matter PMd is set to 0.0 gram/litter. In other words, the DPF 10 should be regenerated completely. In the conditions other than the above, providing that the reference trapped amount PMα is set to 4.0 gram/litter, target amount of remaining particulate matter PMd may be set to 2.0 gram/litter, a half amount of the reference trapped amount PMα.

If the remaining amount of particulate matter PMx has not reached the target amount of remaining particulate matter PMd, the engine controller 16 repeats the process from the step S103 onward. In this case, the target DPF inlet temperature Td is reset in the step S103 on the basis of the amount of remaining particulate matter PMx instead of the amount of trapped particulate matter PMi in the DPF 10. The operation to raise the temperature of the exhaust gas is then executed in the step S104 on the basis of the newly set target DPF inlet temperature Td.

Estimation of the bed temperature Tbed of the DPF 10 is also executed anew in the step S105, whereupon the newly estimated bed temperature Tbed of the DPF 10 is used to repeat the processing of the steps S106–S109.

By means of this process, a regeneration operation of the DPF 10 is executed with a different target DPF inlet temperature Td every time the amount of burned particulate matter PMr trapped in the DPF 10 reaches the target amount of burned particulate matter ΔPM, and the regeneration operation is executed continuously until the amount of remaining particulate matter PMx reaches the target amount of remaining particulate matter PMd.

When the amount of remaining particulate matter PMx reaches the target amount of remaining particulate matter PMd in the step S110, regeneration of the DPF 10 is complete. In this case, in a step S111, the engine controller 16 ends the operation to raise the temperature of the exhaust gas that was begun in the step S104. Following the processing of the step S111, the engine controller 16 ends the routine.

It should be noted that, as described above, the engine controller 16 begins to execute the next routine immediately after ending the current routine.

Figure 2:
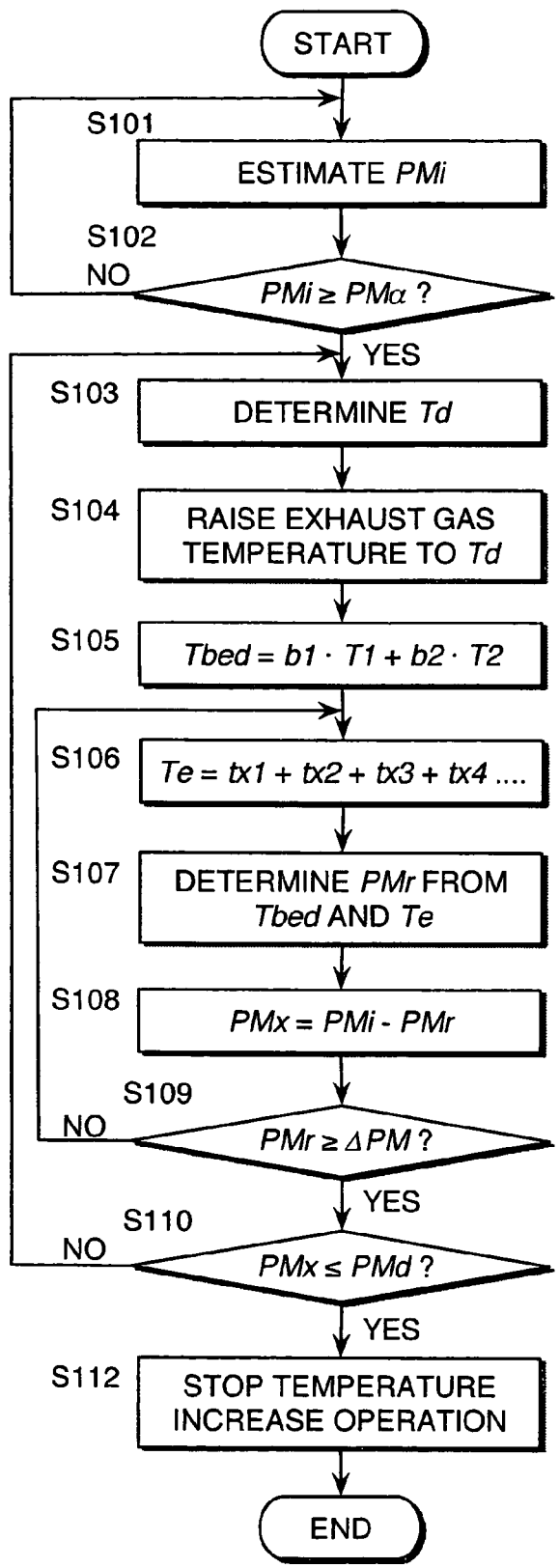
FIG. 2 is a flowchart illustrating a DPF regeneration control routine executed by a controller according to this invention.

By executing the routine in FIG. 2 continuously while the diesel engine 20 is operative in the manner described above, a regeneration operation of the DPF 10 is performed whenever the amount of trapped particulate matter PMi in the DPF 10 reaches the reference trapped amount PMα.

According to this invention as described above, the time during which the DPF bed temperature Tbed exceeds the target bed temperature Tx is cumulatively calculated as the effective regeneration time Te, and the amount of burned particulate matter PMr is determined on the basis of the effective regeneration time Te. Hence the amount of burned particulate matter PMr that is burned by the operation to raise the exhaust gas temperature, and the amount of remaining particulate matter PMx in the DPF 10, can be learned accurately.

Next, referring to FIGS. 6 and 7, a second embodiment of this invention will be described.

The hardware constitution of this embodiment is identical to that of the first embodiment. The engine controller 16 according to this embodiment also executes the routine in FIG. 2. In this embodiment, however, the processing content of the step S106 in FIG. 2 differs from that of the first embodiment.

In the step S106 in the first embodiment, the effective regeneration time Te is calculated as a cumulative value of the time during which the bed temperature Tbed of the DPF 10 exceeds the target bed temperature Tx.

As noted above, the target bed temperature Tx is the temperature at which the particulate matter is burned reliably, but even when the bed temperature Tbed of the DPF 10 does not reach the target bed temperature Tx, a part of the particulate matter can be burned as long as the bed temperature Tbed exceeds a temperature allowing combustion of the particulate matter. Hence in this embodiment, the amount of remaining particulate matter is calculated in consideration of the amount of particulate matter that is burned in this temperature region.

Figure 7:
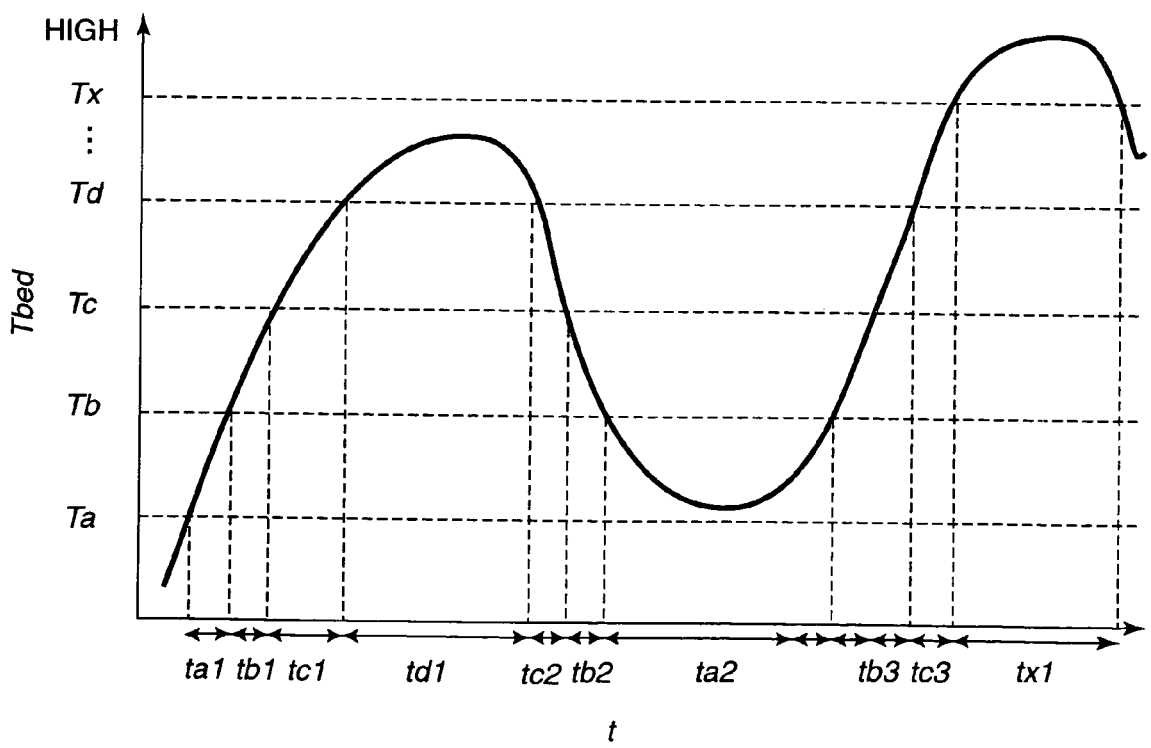
FIG. 7 is a diagram showing the characteristic of a map of an effective regeneration time temperature coefficient K, which is stored by a controller according to the second embodiment of this invention.

Referring to FIG. 7, in the process of reaching the target bed temperature Tx, the bed temperature Tbed of the DPF 10 passes through successive temperatures Ta, Tb, Tc, Td . . . . Here, the temperature Ta indicates a minimum temperature allowing combustion of the particulate matter in the DPF 10. In this temperature increase process, time is expressed in the following manner. That is, the increase period from the temperature Ta to Tb is expressed as ta1, the increase period from the temperature Tb to Tc is expressed as tb1, and the increase period from the temperature Tc to Td is expressed as tc1.

The areas where the bed temperature Tbed falls are also expressed by time periods such as tc2, tb2, and ta2. Thus variation in the bed temperature Tbed can be understood by the temperature region and the duration of the region, and the effective regeneration time Te is cumulatively calculated according to the following equation (4) in order to adopt as the effective regeneration time Te a value obtained by multiplying the duration of a temperature region by a weighting coefficient K shown in FIG. 6 which corresponds to the temperature region.

$$Te = Ka \cdot ta + Kb \cdot tb + Kc \cdot tc + Kd \cdot td + \ldots + tx \quad (4)$$

where, $ta = \Sigma tan$, $tb = \Sigma tbn$, tc=Σtcn,
td=Σtdn,
Ka=the weighting coefficient K of the temperature region from the temperature ta to Tb,
Kb=the weighting coefficient K of the temperature region from the temperature Tb to Tc,
Kc=the weighting coefficient K of the temperature region from the temperature Tc to Td,
Kd=the weighting coefficient K of the temperature region from the temperature Td to Tx, and
n=integers starting from 1.

Figure 6:
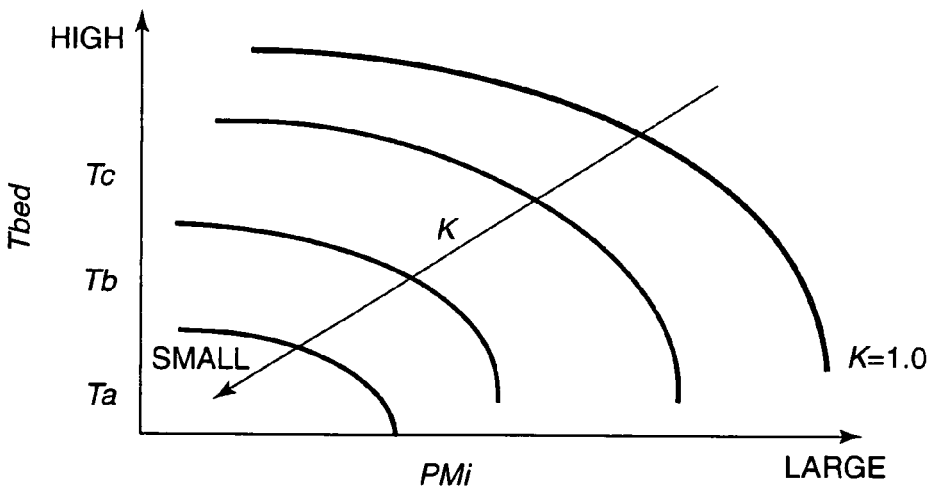
FIG. 6 is a timing chart showing temporal change in the DPF bed temperature Tbed in order to illustrate the computational algorithms of an effective regeneration time Te according to a second embodiment of this invention.

Referring to FIG. 6, the weighting coefficient K expresses the amount of burned particulate matter per unit time in a certain temperature region, and has a maximum value of 1.0. The weighting coefficient K takes a higher value as the bed temperature Tbed rises and the amount of trapped particulate matter PMi increases. In the region where the bed temperature Tbed equals or exceeds the target bed temperature Tx, the weighting coefficient K reaches 1.0.

The map of the weighting coefficient K of the characteristic shown in FIG. 6 is stored in the ROM of the engine controller 16 in advance for the purpose of this calculation.

In the step S106, the engine controller 16 calculates the effective regeneration time Te using the equation (4) above in place of the equation (2). In other words, even if the bed temperature Tbed of the DPF 10 is equal to or lower than the target bed temperature Tx, as long as the bed temperature Tbed exceeds the minimum temperature Ta allowing combustion of the particulate matter, the duration of the corresponding temperature region is used in the calculation of the effective regeneration time Te based on the weighting coefficient K corresponding to the temperature region.

By calculating the amount of burned particulate matter PMi in the temperature regions equal to or below the target bed temperature Tx on the basis of the effective regeneration time Te calculated in this manner, and then calculating the amount of remaining particulate matter PMx, variation in the amount of remaining particulate matter PMx during a regeneration operation of the DPF 10 can be learned with a greater degree of precision.

The contents of Tokugan 2003-325040, with a filing date of Sep. 17, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

The embodiments of this invention in which an exclusive property or privilege is claimed are defined as follows:

1. A regeneration device for a diesel particulate filter which traps particulate matter contained in an exhaust gas of a diesel engine, comprising:
    a sensor which detects a temperature of the filter;
    a mechanism which raises the temperature of the exhaust gas in order to burn the particulate matter trapped in the filter; and
    a programmable controller programmed to:
        cumulatively calculate a time during which the temperature of the filter exceeds a target temperature as a first value;
        determine, when the filter temperature does not exceed the target temperature, whether or not the filter temperature exceeds a temperature allowing combustion of the particulate matter, which is lower than the target temperature;
        calculate a value obtained by multiplying the time during which the filter temperature exceeds the temperature allowing combustion of the particulate matter by a predetermined coefficient, as a second value;
        calculate a sum of the first value and the second value as an effective regeneration time; and
        control the mechanism to stop raising the exhaust gas temperature, on the basis of the effective regeneration time.

2. The regeneration device as defined in claim 1, wherein the controller is further programmed to set a plurality of temperature regions between the temperature allowing combustion of the particulate matter and the target temperature, and cause the coefficient to decrease as the temperature region lowers.

3. The regeneration device as defined in claim 2, wherein the regeneration device further comprises a sensor which detects an amount of particulate matter trapped in the filter, and the controller is further programmed to cause the coefficient to increase as the trapped amount increases.

4. The regeneration device as defined in claim 1, wherein the diesel engine further comprises a combustion chamber, and the mechanism comprises a fuel injector which injects fuel into the combustion chamber and varies a fuel injection amount and a fuel injection timing in accordance with a signal from the controller.

5. The regeneration device as defined in claim 1, wherein the regeneration device further comprises a sensor which detects the amount of particulate matter trapped in the filter, and the controller is further programmed to control the mechanism not to raise the exhaust gas temperature until the amount of particulate matter trapped in the filter reaches a predetermined reference trapped amount.

6. A regeneration device for a diesel particulate filter which traps particulate matter contained in an exhaust gas of a diesel engine, comprising:
    means for determining a temperature of the filter;
    means for raising the temperature of the exhaust gas in order to burn the particulate matter trapped in the filter;
    means for cumulatively calculating a time during which the temperature of the filter exceeds a target temperature as a first value;
    means for determining, when the filter temperature does not exceed the target temperature, whether or not the filter temperature exceeds a temperature allowing combustion of the particulate matter, which is lower than the target temperature;
    means for calculating a value obtained by multiplying the time during which the filter temperature exceeds the temperature allowing combustion of the particulate matter by a predetermined coefficient, as a second value;
    means for calculating a sum of the first value and the second value as an effective regeneration time; and
    means for controlling the raising means to stop raising the exhaust gas temperature, on the basis of the effective regeneration time.

7. A regeneration method for a diesel particulate filter which traps particulate matter contained in an exhaust gas of a diesel engine, the engine comprising a mechanism which raises an exhaust gas temperature in order to burn the particulate matter trapped in the filter, the method comprising:
    determining a temperature of the filter;
    controlling the mechanism to raise the temperature of the exhaust gas in order to burn the particulate matter trapped in the filter;

cumulatively calculating a time during which the temperature of the filter exceeds a target temperature as a first value;

determining, when the filter temperature does not exceed the target temperature, whether or not the filter temperature exceeds a temperature allowing combustion of the particulate matter, which is lower than the target temperature;

calculating a value obtained by multiplying the time during which the filter temperature exceeds the temperature allowing combustion of the particulate matter by a predetermined coefficient, as a second value;

calculating a sum of the first value and the second value as an effective regeneration time; and controlling the mechanism to stop raising the exhaust gas temperature, on the basis of the effective regeneration time.

* * * * *